(12) United States Patent
Cotton

(10) Patent No.: US 9,629,508 B2
(45) Date of Patent: Apr. 25, 2017

(54) RACK MOUNTED PORTABLE PRESSURIZED SOLAR SHOWER

(71) Applicant: Joel Brian Cotton, Silt, CO (US)

(72) Inventor: Joel Brian Cotton, Silt, CO (US)

( * ) Notice: Subject to any disclaimer, the term of this patent is extended or adjusted under 35 U.S.C. 154(b) by 502 days.

(21) Appl. No.: 13/987,783

(22) Filed: Sep. 3, 2013

(65) Prior Publication Data

US 2015/0060467 A1    Mar. 5, 2015

(51) Int. Cl.
*A47K 3/28*    (2006.01)

(52) U.S. Cl.
CPC .................... *A47K 3/285* (2013.01)

(58) Field of Classification Search
CPC ....................................... A47K 3/285
USPC ................... 4/596, 598, 602, 612
See application file for complete search history.

(56) References Cited

U.S. PATENT DOCUMENTS

| | | | |
|---|---|---|---|
| 3,265,262 A * | 8/1966 | Motsinger | E03B 11/04 224/309 |
| 3,696,979 A * | 10/1972 | Erickson | B60R 9/04 220/483 |
| 4,098,328 A * | 7/1978 | Cheong | F28F 9/0231 123/41.54 |
| 4,355,629 A * | 10/1982 | Cornell, III | F24J 2/10 126/640 |
| 4,364,133 A * | 12/1982 | Gunter | A47K 3/28 296/156 |
| 5,012,536 A * | 5/1991 | Rivera | E03C 1/023 4/605 |
| 5,507,275 A * | 4/1996 | Clark | A47K 3/325 126/591 |
| 6,082,353 A | 7/2000 | Van Doorn | |
| 7,766,007 B2 * | 8/2010 | Staschik | F24J 2/0488 126/569 |
| 8,104,112 B2 * | 1/2012 | Tsai | A47K 3/285 126/640 |
| 8,225,436 B1 | 7/2012 | Cotton | |

FOREIGN PATENT DOCUMENTS

EP    0655588 A1    7/1998

* cited by examiner

*Primary Examiner* — Huyen Le
(74) *Attorney, Agent, or Firm* — Harold A. Burdick

(57) ABSTRACT

Improvements on a portable pressurized solar shower which is mounted on the roof of a vehicle using roof rack mounting hardware. The vessel is an elongated elliptical shape (20), which is capped on both ends (32) with an endplate. It can be filled by removing a radiator cap (34) on top. Water can be sprayed out using an attached hose (60) and nozzle (70). The vessel is made from black painted or coated conductive metal which absorbs the sunlight and transfers the heat to the water on the inside. The vessel can be pressurized by an air pump via a valve stem (39) installed on the vessel. A mounting bolt slides within a T-slot which is integrated as part of the shower vessel.

7 Claims, 2 Drawing Sheets

RACK MOUNTED PORTABLE PRESSURIZED SOLAR SHOWER

CROSS-REFERENCE TO RELATED APPLICATIONS

This application claims the benefit of provisional patent application 61/851,582 filed Mar. 11, 2013 by the present inventor and 61/743,395 filed Sep. 4, 2012.

FEDERALLY SPONSORED RESEARCH

Not Applicable

SEQUENCE LISTING OR PROGRAM

Not Applicable

BACKGROUND OF THE INTENTION

Field of Portable Solar Shower

This portable solar shower pertains to equipment for storing and dispensing water when access to a permanent water supply or shower is not readily available and more particularly to a pressurized solar heated shower. This shower contains improvements over a previously patented rack mounted solar shower.

Prior Art

U.S. Pat. No. 8,225,436 B1 references a Rack Mounted Portable Pressurized Solar Shower. This shower is mounted to the roof of a vehicle using roof rack mounting hardware. Patent EP0655588 A1—Shower apparatus heated by solar radiation, shows a solar shower that uses aluminum-magnesium alloy tube as the solar collector. Solar panel and method of manufacturing thereof, U.S. Pat. No. 6,082,353 shows copper pipes embedded in aluminum plates which help with the solar gain. Prior art teaches that black metal pipes will absorb sun and heat water.

Background of Portable Solar Shower—Objects and Advantages

Several objects and advantages of the present improvements portable solar shower are:
(a) to heat water better due to the shape of the shower and the material.
(b) to provide a more aesthetic appearance
(c) to provide a more secure attachment.
(d) to provide a more durable shower that is less prone to breakage during rough travel.
(e) to provide more rapid heating of the water.

Still further objects and advantages will become apparent from a consideration of the ensuing description and drawings.

SUMMARY

In accordance with the present portable solar shower there is provided a portable solar shower apparatus that can be mounted on a vehicle. It is similar to and teaches improvements to the apparatus referenced in U.S. Pat. No. 8,225,436 B1. The present portable solar shower is constructed from a metal alloy, such as aluminum, and painted or coated black, or another dark color to absorb the sunlight. The black metal is more durable than plastic, glass, or acrylic pipe, which results in less breakage during shipping and during rough outdoor use. The cross sectional shape is elliptical so that more surface area faces the sky for more exposure to solar rays which provides for greater heating. In addition, the slotted trough in U.S. Pat. No. 8,225,436 B1 is incorporated into the vessel and does not have to be attached as a separate object, which results in a more durable unit which is more aesthetic.

DRAWINGS—FIGS. 1-2

The present portable solar shower can be more readily understood by a consideration of the following detailed description when taken in conjunction with the accompanying drawings in which.

Figure 1:
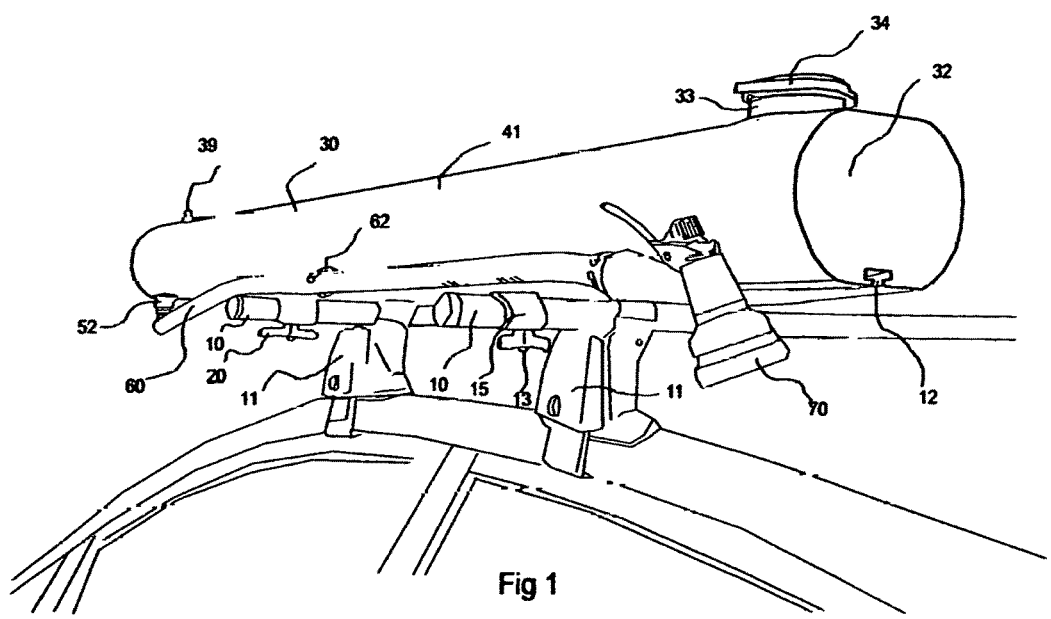
FIG. 1 is a perspective drawing of the portable solar shower mounted in accordance with a preferred embodiment of the present portable solar shower, showing a pressure vessel with an attached hose and sprayer, mounted on a vehicle roof rack.

REFERENCE NUMERALS 10 vehicle roof rack cross bar
11 vehicle roof mounting brackets
12 roof rack mounting T slot
13 mounting bolt
16 internal rib for connecting clips
20 threaded nut
30 pressure vessel
32 end plate
33 radiator neck
34 radiator cap
39 valve stem
41 black coated metal tube
52 elbow connector
60 hose
62 hose mount
70 spray nozzle

DETAILED DESCRIPTION—FIGS. 1, 2

Figure 2:
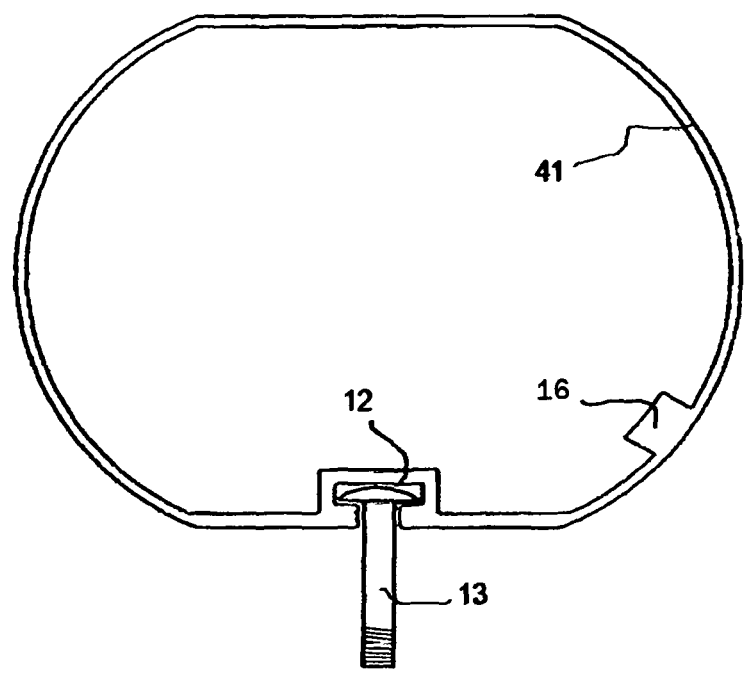
FIG. 2 is a drawing of the cross section of the tube showing the elliptical shape, the built in slot and the rib to which the clips are attached.

This description details the current rack mounted pressurized solar shower. Referring more particularly to the FIG. 1, the roof of an automobile has a portable roof rack or permanent luggage rack attached thereto as is common. There is a pair of mounting brackets 11 to attach the crossbars to the automobile. Spanning each pair of mounting brackets is a tubular crossbar, there being a front crossbar 10 and a rear crossbar 10, both hollow pipes. Each crossbar is attached to the solar shower apparatus via the T Slot 12. Referring to FIG. 2 the head of the bolt 13 is slid from the end of the solar shower through top of T slot 12 towards the crossbar 10. Vessel 30 defines an internal volume_ and is attached by bolt 13 inserted in damp bracket 15, which is a flexible plastic wrap that can be opened an encircle the crossbar, and tightened down with nut 20.

Vessel 30 is manufactured using a metal that has high heat conductivity. Vessel 30 is painted, coated, or anodized black or other dark color. Vessel 30 has the shape of a flattened elliptical tube. Flat metal plates 32 are welded to each end of the metal vessel 41 to seal it Plates are cheaper to manufacture and easier to attach to the metal vessel then a molded cap. Aluminum is the preferred embodiment in this example, due to the low cost and the high heat conductive capability. Other metals could just as easily be used. Aluminum can be painted, powder coated, or anodized. Any of these methods could be used depending on cost and durability desired. Black is the color that absorbs sunlight the best, however other dark colors will do well, such as dark green, dark blue, or dark brown. The sunlight heats the vessel and the vessel heats the water which is in contact with the vessel on the inside.

A radiator neck 33 is welded to the vessel 30. A radiator neck 33 provides the opening to fill the vessel. A radiator cap 34 is used and to provide pressure release capability. Radiator caps are designed to release hot water and pressure.

Referring to FIG. 2 is a more detailed view of the cross section of the tube 41. A mounting bolt 13 slides within the top of T-slot 12. The T-slot 12 is integrated as part of the shower vessel. There is an internal rib 16 so that the clips that hold the hose can be screwed into the vessel without puncturing the vessel itself. The top of the tube is flat. This allows more sunlight to be adsorbed and also allows a flat surface to place objects on, such as shampoo and conditioner.

ALTERNATIVE EMBODIMENTS

Pressure vessel 30 could be made with a flatter shape, longer, wider or shorter, thereby improving the solar collection efficiency. There are other means of mounting devices on roof racks, and this portable solar shower could have made use of these other means just as easily as the one used in the preferred embodiment. Pressure vessel 30, could be removed from the vehicle rack and used at a camp or a cabin. The bolt 12 could be inserted through a hole in a board or a piece of flat metal, and attached with nut 20. Spray nozzle 70 could be substituted by a shower head or other types of spray nozzles.

ADVANTAGES

From the description above, a number of advantages of this rack mounted pressurized solar shower become evident:
a) The vessel which is made from black coated heat conductive metal can heat water faster and hotter than the previous shower with the clear window. The entire unit is a heat absorber, instead of a small clear window.
b) The vessel which is made from black coated metal will not break as easily as the previous shower with the clear window that has to be a glass or plastic.
c) The built in T slot in the vessel means there is less material needed for construction. The band damps from the previous version are eliminated so the chance of the vessel coming loose from the trough is eliminated.
d) The built in slot and the flat bottom mean that the shower will rock less on rough roads. This will help prevent the shower from ripping off the rack due to the bolt head failure that fits in the trough.
e) The radiator cap and neck provide a time tested and proven method of filling with water and releasing pressure when over pressurized.
f) The rib inside the vessel provides a way to attach the clips with screws without puncturing the seal of the vessel.
g) The flat elliptical shape and the flat top allows for more surface exposure to the sun and greater solar gain.
h) The built in slot and the elliptical shape create are design that is more aesthetically pleasing.

CONCLUSION, RAMIFICATION, AND SCOPE

Accordingly, the reader will see that the rack mounted pressurized solar shower can be used as a convenient liquid transportation system for camping. The dark conductive metal improves the solar gain over the previous shower. Improvements in this solar shower make it far more durable, and less likely to break or crack. The elliptical shape allows for greater solar gain. The built in slot is a stronger, more stable method for attaching the shower to the vehicle rack and is cheaper to manufacture. A radiator cap and radiator neck can be used for the pressure cap and provides a mass produced and time tested and reliable way to fill the vessel and release pressure in the event of over pressurization. The internal rib allows dips to be attached to the vessel itself.

Although the description above contains much specificity, these should not be construed as limiting the scope of the portable solar shower but as merely providing illustrations of some of the presently preferred embodiments of this portable solar shower.

Thus, the scope of the present portable solar shower should be determined by the appended claims and their legal equivalents, rather than by the examples given.

I claim:

1. A rack mounted solar shower water storage apparatus comprising:
   a vessel having an elliptical cross section and defining an internal volume, said vessel made from a heat conductive material, said vessel coated, anodized, or painted a dark color and having an internal rib of metal extending longitudinally an entire length of said internal volume of said vessel, said rib allowing screws to be screwed into said vessel thereat for attaching to said vessel without puncturing said internal volume;
   a spray nozzle communicating with said internal volume of said vessel;
   a neck connected with said vessel providing an opening into said internal volume of said vessel and releasably closable by a pressure release cap to accommodate filling of said vessel and pressure release should over pressurization of said vessel occur.

2. The rack mounted solar shower water storage apparatus of claim 1 wherein said vessel has a substantially flat underside to inhibit rocking on rough roads in order to prevent mounting hardware failure.

3. A rack mounted solar shower water storage apparatus comprising:
   a vessel including an outer shell defining an internal water storage volume and a length, said outer shell of said vessel having an underside; and
   a T-slot integrally formed in said underside of said outer shell of said vessel extending longitudinally the entire said length of said underside of said outer shell of said vessel, said slot slidably admitting a carriage bolt at one slot end which is adjustably movable along said T-slot.

4. The rack mounted solar shower water storage vessel of claim 3 wherein said vessel includes flat metal end plates secured at opposite ends of said outer shell.

5. A rack mounted solar shower water storage vessel comprising an internal rib of metal extending longitudinally an entire length of an internal volume of said vessel, said rib allowing screws to be screwed into said vessel thereat for attaching to said vessel without puncturing said internal volume.

6. The rack mounted solar shower water storage vessel of claim 5 wherein said vessel defines a substantially flattened elliptical shape with a flat top.

7. The rack mounted solar shower water storage vessel of claim 5 further comprising a fill neck connected with said vessel and communicating with said internal volume and a pressure relief cap releasably securable at said neck to close said internal volume and to release pressure from said vessel in the result of over pressurization.

* * * * *